United States Patent [19]

Merritt

[11] Patent Number: 5,406,912
[45] Date of Patent: Apr. 18, 1995

[54] INTERNAL COMBUSTION ENGINE

[75] Inventor: Dan Merritt, Coventry, England

[73] Assignee: Coventry University, Coventry, England

[21] Appl. No.: 969,718

[22] Filed: Oct. 30, 1992

[30] Foreign Application Priority Data

Nov. 2, 1991 [GB] United Kingdom ............... 9123489
Jul. 2, 1992 [GB] United Kingdom ............... 9214044

[51] Int. Cl.⁶ .......................................... F02B 25/12
[52] U.S. Cl. .............................. 123/52.3; 123/658; 123/78 A; 123/299
[58] Field of Search ............. 123/48 R, 48 A, 48 AA, 123/48 C, 51 A, 51 AA, 52.1, 52.2, 52.3, 52.4, 54.1, 59 BS, 299, 658, 78 A, 78 R, 78 AA, 78 C

[56] References Cited

U.S. PATENT DOCUMENTS

| | | | |
|---|---|---|---|
| 1,889,650 | 11/1932 | Fredricksen | 123/53 AA |
| 4,070,999 | 1/1978 | Matsuno | 123/59 BS |
| 4,104,995 | 8/1978 | Steinbock | 123/51 AA |
| 4,106,445 | 8/1978 | Beveridge | 123/53 A |
| 4,580,532 | 4/1986 | Jackson | 123/53 A |
| 4,586,465 | 5/1986 | Krogdahl | 123/59 BS |
| 4,759,319 | 7/1988 | Merritt | 123/51 AA |
| 4,898,126 | 2/1990 | Merritt | 123/53 AA |
| 4,981,114 | 1/1991 | Skopil | 123/51 AA |
| 5,009,207 | 4/1991 | Merritt | 123/261 |
| 5,060,609 | 10/1991 | Merritt | 123/256 |
| 5,117,789 | 6/1992 | Merritt | 123/289 |

Primary Examiner—Noah P. Kamen
Attorney, Agent, or Firm—Ware, Fressola, Van Der Sluys & Adolphson

[57] ABSTRACT

An internal combustion engine has at least one set of first and second cylinders (12,14), the first cylinder (12) having a larger swept volume than the second cylinder (14), and respective first and second pistons (16,18) movable in the cylinders. The pistons are coupled together such that they are movable in the cylinders in a cyclic manner at the same frequency. An air inlet (24) and an exhaust outlet open into the first cylinder and a fuel injector (34) provides fuel to the second cylinder. A combustion space (20) is also provided which communicates with both cylinders during at least a portion of the expansion stroke. The second piston has a crown (35) and a body portion (19), with the crown being spaced from and connected to the body portion and having an edge (37) which is relatively small in the axial direction compared to the distance between the crown and the body portion in the axial direction. The combustion space (20) is defined between the piston crown and body portion and a side wall (14a) of the second cylinder. The gap (128) between the crown edge (37) and the cylinder wall (14a) serves to inhibit ingression of fuel into the combustion space (20) until towards the end of the compression stroke. Access means (30) associated with the second cylinder for admitting fuel and/or air to the second cylinder during the induction stroke comprises a port (33) opening into the second cylinder and a valve (31) for controlling port.

31 Claims, 7 Drawing Sheets

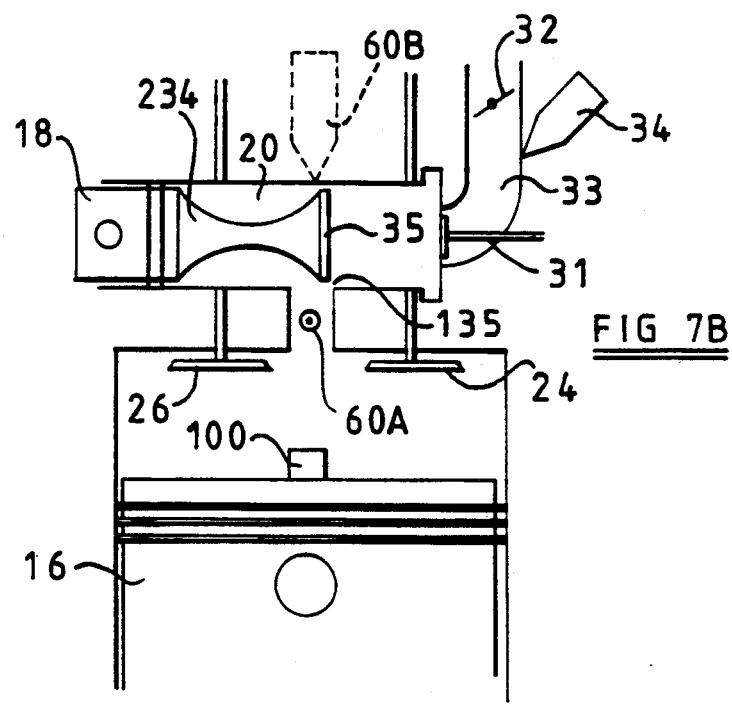
FIG 7B
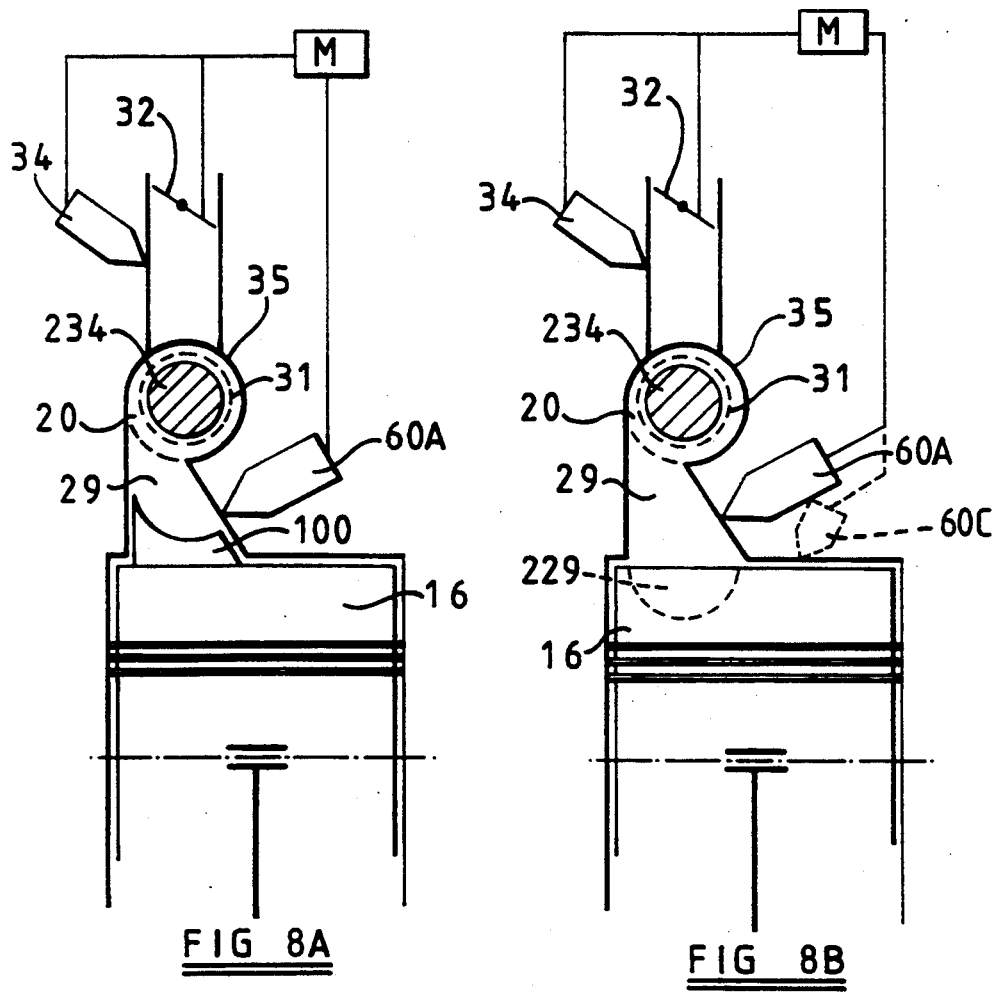
FIG 8A
FIG 8B

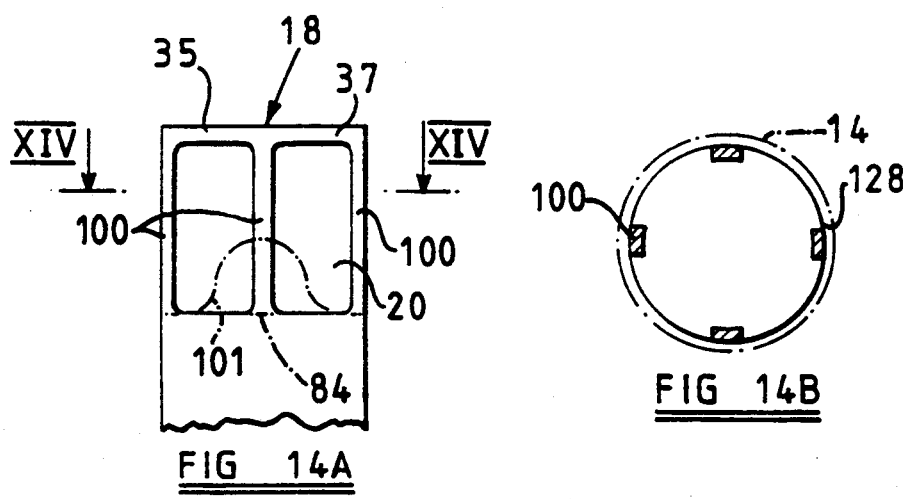
FIG 14A
FIG 14B
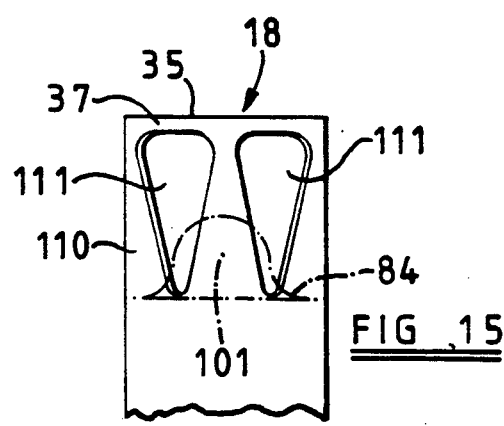
FIG 15
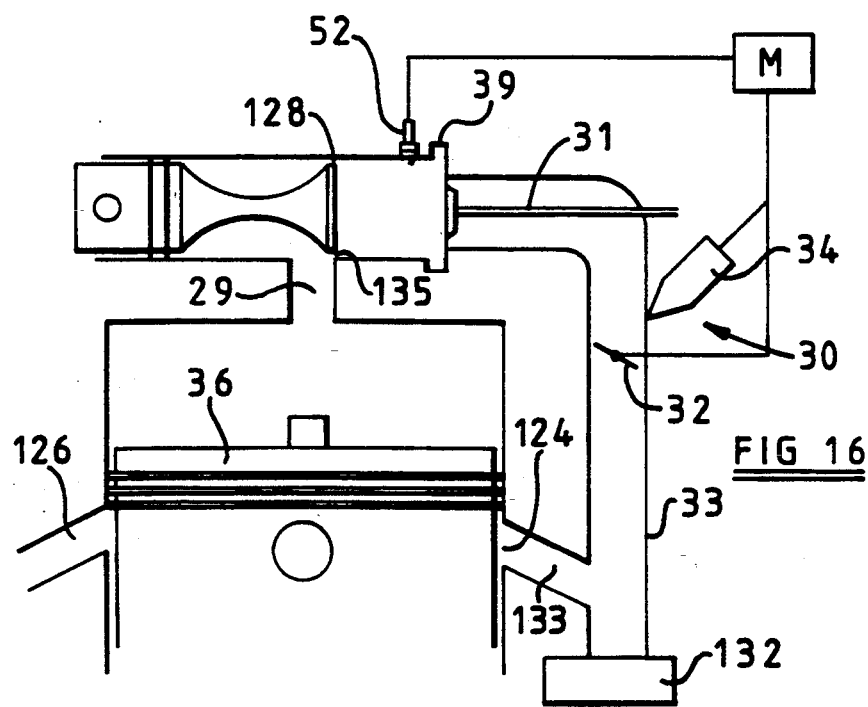
FIG 16

INTERNAL COMBUSTION ENGINE

FIELD OF THE INVENTION

The present invention relates to an internal combustion engine.

BACKGROUND OF THE INVENTION

Internal combustion engines can be classified as segregating or non-segregating engines. All such engines use a compression stroke which precedes the ignition and combustion of fuel which is mixed with air.

In a non-segregating engine the fuel is mixed with the air before the start of the compression stroke as is the case with spark ignition gasoline engines commonly called SIGE engines. In some SIGE engines, known as stratified charge engines, which are not now common, the fuel is introduced to the air during the compression stroke but well before ignition which is started with a spark. In all non segregating engines the maximum compression pressure is limited since a pre-mixed air-fuel gas mixture can be ignited by the high temperature generated in the compression process before the spark occurs.

SIGE engines require the air fuel mixture to be nearly chemically correct. This restriction together with lower compression ratios and the need to throttle the air input at part load, which are all associated with this combustion system, result in a relatively poor thermal efficiency for the SIGE engine. Its main advantage is a fast combustion process, hence higher engine speed and power brought about by the fast burn of a pre-mixed gaseous mixture of fuel and air.

A segregating engine will compress all, or most of the air, without fuel and introduce the fuel into the air near the end of the compression stroke at the point where ignition is to be started. The familiar segregating engine is the diesel engine which injects liquid fuel into the combustion chamber, under very high pressure, near the end of the compression stroke.

The segregating engine has the capability of much higher thermal efficiency compared with the SIGE engine, particularly at part load. Its compression pressures, which enhance efficiency, are not limited by the danger of pre-ignition. No throttling is required at part load so avoiding pumping losses. Lean burning at part load is possible which also improves thermal efficiency.

The disadvantage of the diesel segregation method is the relatively long time it takes to inject the liquid fuel and vaporise it before it can ignite and burn fast. The diesel engine is therefore thermally more efficient than the SIGE engine but cannot run at the same high RPM as the SIGE and produces less power from a given size and weight. At high loads and high speed, combustion proceeds well into the expansion stroke, greatly penalising the thermal efficiency of the diesel engine.

RELATED ART

Various types of segregating engines invented by the Applicant are known for example from U.S. Pat. Nos. 4,759,319; 4,898,126; 5,009,207; 5,060,609; and 5,117,789. Those engines are now known in literature as the Merritt engines.

The Merritt engine has one or more sets of first and second cylinders and respective first and second pistons movable in said cylinders. The first cylinder has a larger swept volume than the second cylinder and an air inlet valve and/or port and an exhaust valve and/or port communicate with the first cylinder. A fuel source provides fuel to the second cylinder. These are means defining a combustion space when the pistons are substantially at the inner dead center position, the combustion space communicating with both cylinders during at least an early part of the expansion stroke, and inhibiting means for inhibiting ingression, that is movement of fuel/air mixture from the second cylinder into the combustion space.

The Merritt engine is therefore a segregating engine like the diesel engine with a difference that some small quantity of the air is compressed with all the fuel in the smaller second cylinder, whereas most of the air is compressed on its own in a larger first cylinder. The very rich fuel/air mixture in the second cylinder will not explode during compression because it is too rich. It is also known that a small quantity of fuel can also be mixed with the air in the first cylinder without exploding during the compression stroke because it is too lean.

Compared with the segregating diesel engine where fuel is injected into the engine at the end of the compression stroke, the Merritt engine allows fuel to be delivered to the engine for a substantially longer part of the cycle period of the engine. In that way, the fuel is given longer to vaporise from liquid to gas but not to mix fully with most of the compressed air originally in the first cylinder until combustion is under way in the combustion chamber.

It has been established and made known in the aforementioned patent specifications that with such an arrangement of unequal swept volume cylinders communicating with a common combustion chamber and where the fuel is contained in the smaller cylinder, a process referred to herein as "gas dynamic segregation" results.

Gas dynamic segregation is distinguished from the mechanical type segregation of the diesel engine where a mechanical valve device (typically a needle valve in the fuel injector) shuts off the fuel supply to the engine until the moment of fuel delivery. In the gas dynamic segregating process produced in the Merritt engine, the air contained in the larger first cylinder and combustion chamber is known to move into the smaller second cylinder during most of the compression stroke. This creates a flow of air from the combustion chamber to the second cylinder where all, or most, of the fuel is contained, thus stopping the movement of fuel into the combustion chamber. Near the end of the compression stroke, the gas flow is reversed as the pressure in the second cylinder becomes greater than that in the combustion chamber and the fuel which has vaporised in the smaller cylinder together with a small proportion of the air has to enter the combustion chamber.

The thermal efficiency of reciprocating internal combustion engines can be greatly improved by providing the following features:
 i) Very fast and complete combustion or "constant volume" combustion.
 ii) Lower gas temperatures following combustion at part load by means of ultra lean air fuel mixtures.
 iii) High but realistic compression ratio values.

SUMMARY OF THE INVENTION

The present invention seeks to provide an improved internal combustion engine.

Accordingly, the present invention provides an internal combustion engine comprising:

at least one set of first and second cylinders, the first cylinder having a larger swept volume than the second cylinder;

respective first and second pistons each movable between an inner dead center position and an outer dead center position in a respective one of said cylinders;

air inlet means communicating with the first cylinder;

exhaust means communicating with the first cylinder;

a first fuel source for providing fuel to the second cylinder;

means defining a combustion space when the pistons are substantially at their inner dead center positions, the combustion space communicating simultaneously with both cylinders during an expansion stroke of the pistons;

inhibiting means for inhibiting movement of fuel/air mixture from the second cylinder into the combustion space until towards an end of a compression stroke of the second piston;

access means associated with the second cylinder for admitting air to the second cylinder during an induction stroke of the second piston from its inner to its outer dead center position, said access means comprising a first port means opening into said second cylinder and a first valve means for controlling said first port means;

and means coupling said first and second pistons such that said pistons are reciprocable in said cylinders at an identical frequency;

wherein the second piston is not formed integrally with the first piston;

wherein the second piston has a crown and a body portion spaced apart by a predetermined distance in a direction axially of the second piston, said crown is connected to said body portion by a reduced diameter portion and has an edge which is relatively small in said axial direction compared to the distance between said crown and said body portion in said axial direction, thereby to define said combustion space between said piston crown and body portion and a side wall of said second cylinder;

and wherein the edge of the second piston crown is radially spaced from the side wall of the second cylinder to define a gap therebetween which comprises said inhibiting means, said gap being continuous throughout the entire stroke of the second piston.

The term "valve" as used herein embraces a port.

The term "air" as used herein includes any suitable mixture of oxygen with other usually inert gases as well as substantially pure oxygen for combustion with gaseous or liquid (i.e. vaporised liquid) fuel. It may contain recirculated exhaust gases, crankcase gases and a small proportion of hydrocarbon substances present in recirculated internal combustion engine gases.

The term "ingression" as used herein refers to the movement of fuel/air mixture from the second cylinder into the combustion space.

GB-A-2246394 to the applicants discloses an internal combustion engine having a type of piston which enables a combustion space to be produced more easily and also gives a number of other important advantages. An example of this type of piston is shown in FIG. 1.

In the engine shown in FIG. 1, the combustion space or chamber 20 is only partially defined or bounded by the second piston 18. In such an arrangement the second piston can have a crown 35 which is spaced from and connected to the crown 36 of the first piston and which has an edge 37 in the axial direction which is relatively thin compared to the spacing of the first piston crown 36 from the second piston crown 35, in the axial direction, the second piston crown preferably always remaining in the second cylinder. In that way, it is possible to define a combustion space between the two piston crowns and the wall 14a of the second cylinder which avoids the need to provide the combustion chamber 20 fully enclosed within the smaller piston itself. The larger cylinder 12 has inlet and exhaust valves 24,26.

The smaller piston 18 is concentric with the larger piston 16 and includes a pillar 234 and a raised portion or base 84 by which a crown 35 of the piston 18 is connected to or integral with the piston 16. It will be seen from FIG. 1 that the pillar 234 is curved in contour, the curve encouraging swirl of the air entering the combustion space 20 from larger cylinder 12 and swirl of the fuel/air mixture following ingression into the combustion space 20. The combustion space 20 is defined between the pillar 234 and the wall, indicated generally at 14a, of the smaller cylinder 14. The shape and size of the pillar are chosen to produce a suitable combustion volume of appropriate size and shape.

The edge 37 is spaced slightly away from the wall 14a of the second cylinder to define inhibiting means in the form of an annular gap 128 which inhibits ingression prior to the pistons arriving at or adjacent the inner dead center position. The upper end of the smaller cylinder 14 as viewed in the drawing is formed with an optional peripheral groove 39 which, when present, provides a by-pass to promote ingression.

The upper end of the smaller cylinder 14 is provided with access means indicated generally at 30 comprising a second inlet valve 31 and a throttle valve 32. The access means enables control of the pressure in the second cylinder to a value below the pressure in the first cylinder during an early part of the compression stroke, thereby to inhibit ingression prior to the second piston arriving at or adjacent its inner dead center position. A fuel injector 34 is provided for delivering liquid fuel into the inlet duct 33 leading to the inlet valve 31. The throttle valve 32 controls the quantity of air flowing through the inlet duct 33 and does so substantially independently of the quantity of the fuel delivered by the fuel injector 34. By controlling the access means 30, the pressure in the smaller cylinder 14 can be controlled accurately to provide optimum timing of ingression which will, in turn, control ignition timing to give optimum running characteristics of the engine over its full speed and load range. The operation of the throttle valve 32 and also the operation of the injector 34 is preferably controlled by an engine management system M.

During the induction stroke of the engine, air enters the larger cylinder 12 through the inlet duct 25. Air also enters the smaller cylinder 14 through open valve 31 along with fuel from injector 34. The throttle valve 32 controls the air mass entering the smaller cylinder 14 and can ensure that during the induction stroke of the engine, the air/fuel mixture entering the smaller cylinder 14 through the inlet valve 31 will normally be below the pressure in the larger cylinder 12. The timing of the closure of valve 31 after the closure of inlet valve 24 during the early part (during part or all of the first half) of the compression stroke can also ensure that the pressure in the second cylinder 14 is below the pressure in the first cylinder 12 when valve 31 closes. The difference in pressure across the crown 35 of the piston 18 during the compression stroke will have an effect on the timing of ingression of contents of the smaller cylinder 14 into the combustion space 20 near the inner dead center position of the piston 18 at the end of the compression stroke. This, in turn, controls the timing of the ignition of vaporised fuel by, for instance, compression ignition when the fuel/air mixture in cylinder 14 meets the relatively hotter air delivered to the combustion space 20 by the larger piston 16 during the compression stroke.

During the induction and compression strokes of the engine, the fuel entering the second cylinder via second inlet valve 31 vaporises in the smaller cylinder 14. Near the inner dead center position, towards the end of the compression stroke the peripheral edge 37 of the crown 35 reaches the position shown in broken lines adjacent the by-pass 39 which effectively increases the size of the inhibiting means and the air/fuel mixture in vapor form rushes around the peripheral edge 37 through the by-pass 39 and into the combustion space 20. The air in the combustion space is compressed and is at a sufficiently high temperature to cause spontaneous ignition of the fuel/air mixture entering the combustion space and expansion of gases in the combustion space then forces the pistons 16, 18 downwardly to start an expansion stroke. The axial length of the groove 39 is greater than the thickness t of the second piston crown 35 to provide an enlarged gap for the fuel/air mixture to ingress around the crown through the by-pass groove 39.

The groove 39 also provides a clearance volume in the second cylinder 14, that is a volume which is not diminished by movement of the piston 18 in the second cylinder. The clearance volume effectively delays ingression timing by providing extra volume for the fuel/air mixture in cylinder 12 during the compression stroke but which communicates with the combustion space 20 at the time of ingression. Another function of the groove 39 is to allow the flame and the resulting pressure increase in combustion space 20 to communicate with the space above the second piston crown 35. In that way the flame can burn off any fuel which remains above the second piston crown 35 following ingression.

Whilst the small cylinder 14 is shown with a by-pass groove 39 at its upper end, the size of the gap 128 can be selected so that the gap 128 alone i.e. without the by-pass 39, provides the entire inhibiting means forming the passageway for ingression. In such a case, the size of the gap 128 is carefully chosen to ensure adequate segregation between the upper surface of crown 35 and the combustion space 20 during most of the compression stroke.

The crown 35 is cooled by the incoming fuel and air entering through second inlet valve 31, by the effect of vaporisation of the fuel in the air during the compression stroke and by conduction of heat through pillar 234.

Valve 31 may be used as a dual inlet and exhaust valve which has the advantage that any unburnt fuel remaining in cylinder 14 at the end of the exhaust stroke need not leave the engine, so reducing exhaust pollution.

The reader is directed to U.S. Pat. No. 5,117,789 for a full disclosure of the engine described above with reference to FIG. 1, the content of which specification is incorporated herein by reference.

THE DRAWINGS

The present invention is further described hereinafter by way of example, with reference to the accompanying drawings, in which:

FIG. 1 is a diagrammatic cross section of the prior art Merritt Engine disclosed in FIG. 3 of my U.S. Pat. No. 5,117,789;

FIG. 7B is a view similar to that of FIG. 7A showing the pistons at their outer dead center positions;

FIG. 8A is a side elevation, partly in section, of the engine of FIGS. 7A and 7B showing a modification thereof;

FIG. 8B is a view, similar to that of FIG. 8A, showing a further modification of the engine of FIGS. 7A and 7B;

FIG. 14A shows a further form of smaller piston;

FIG. 14B is a cross-section through the piston of FIG. 14A on a line XIV—XIV;

FIG. 15 is a side elevation of a still further smaller piston construction; and

FIG. 16 is a partial section through a two-stroke form of the engine of FIGS. 2 to 5.

DETAILED DESCRIPTION OF THE DRAWINGS

Figure 1:
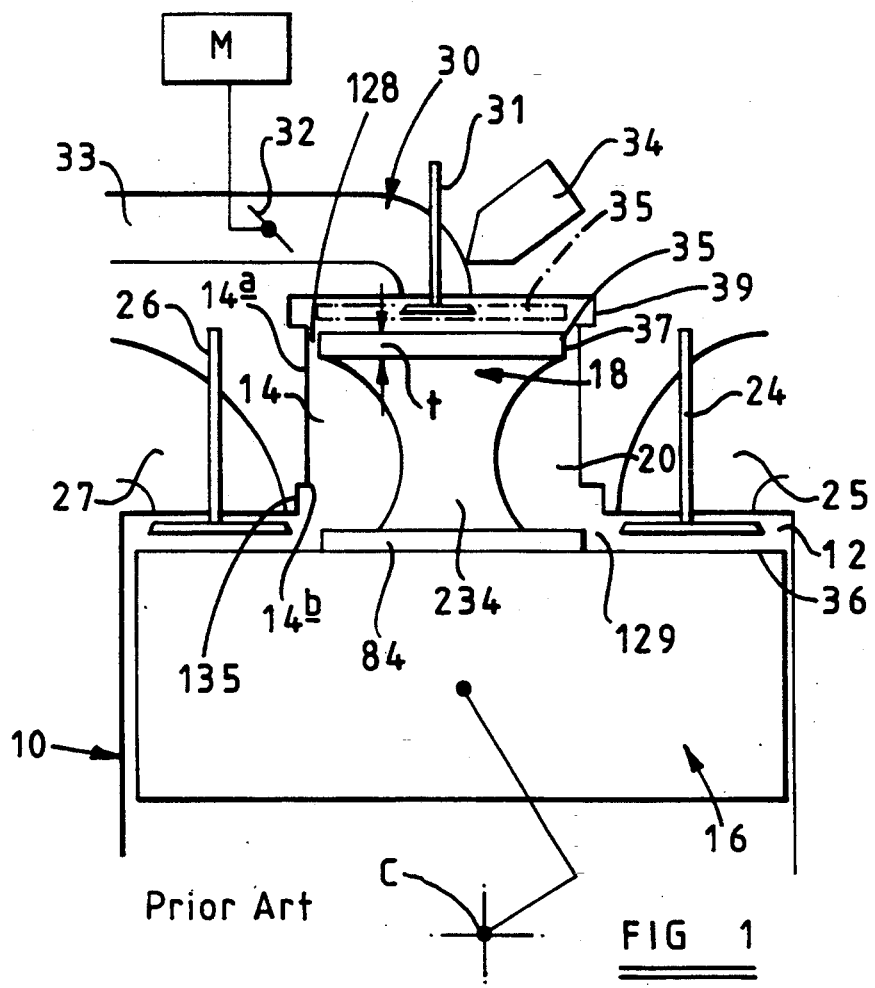
FIG. 1 shows an embodiment of the prior art.
Figure 2:
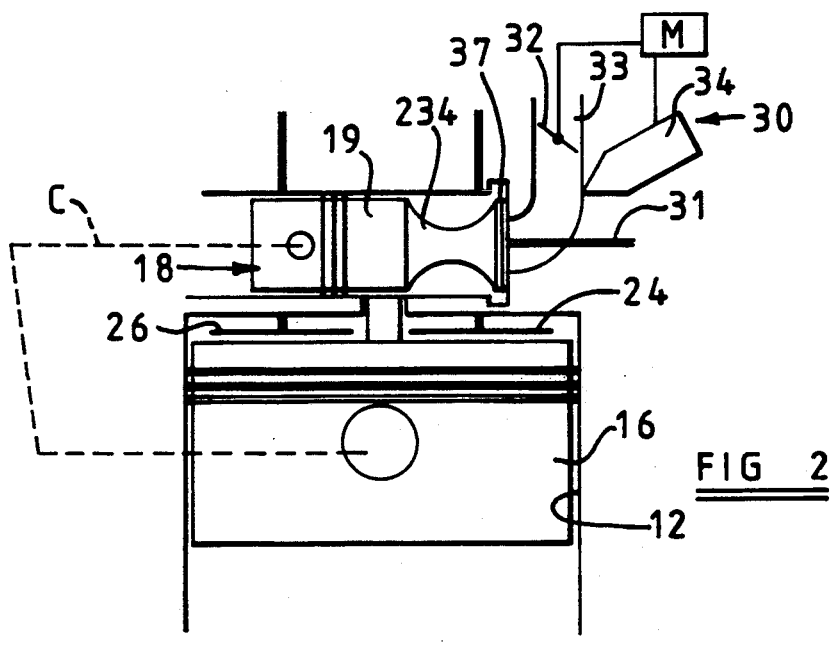
FIG. 2 is a part sectional elevation through a portion of a preferred form of internal combustion engine according to the present invention with the two pistons at or adjacent their inner dead center positions.
Figure 3:
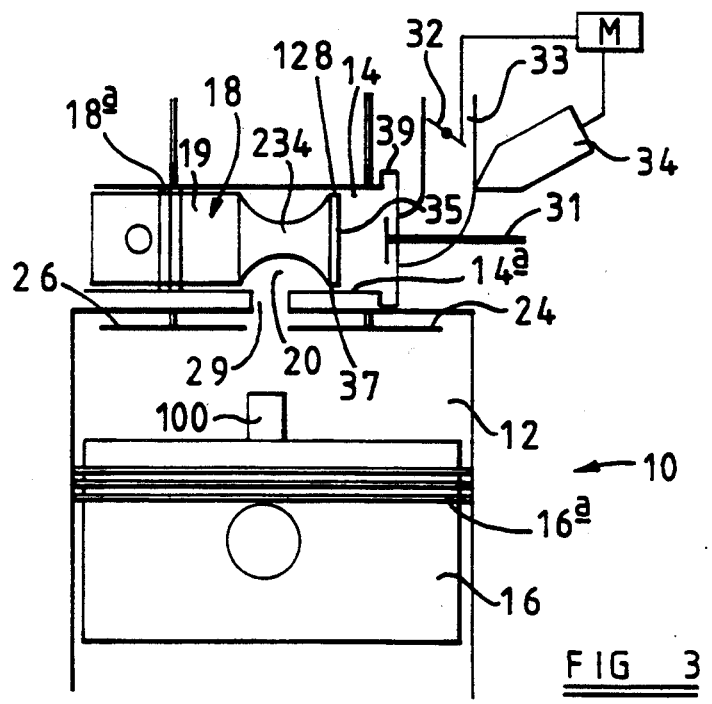
FIG. 3 is a view similar to that of FIG. 2 during an induction stroke of the engine.
Figure 4:
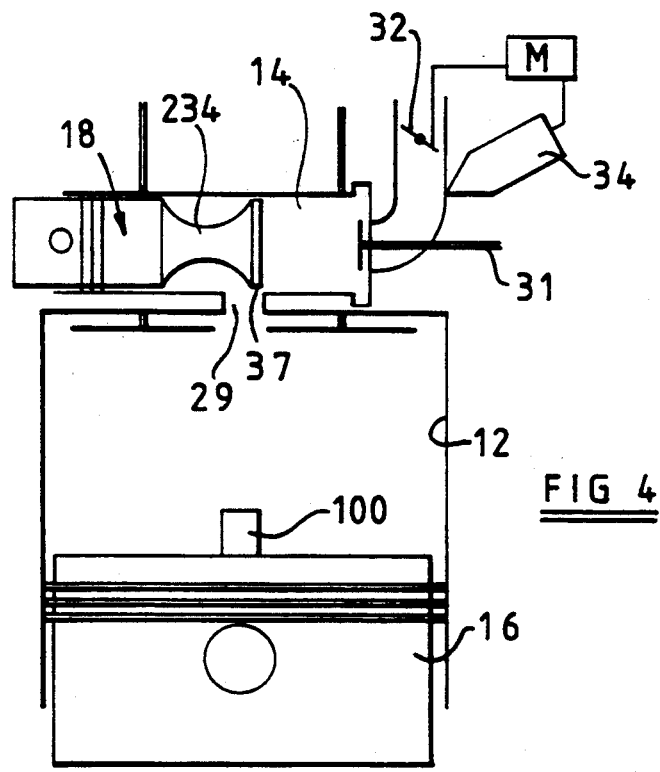
FIG. 4 is a view similar to that of FIG. 2 with the pistons at or adjacent their outer dead center positions.
Figure 5:
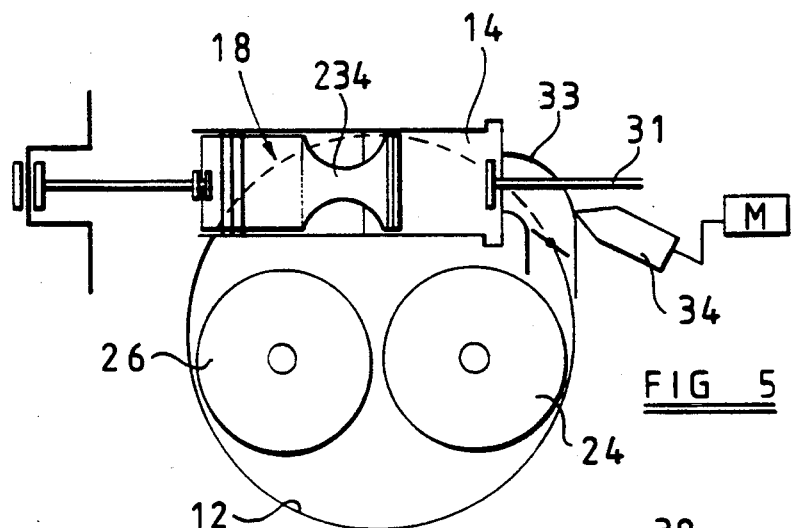
FIG. 5 is a part sectional plan view of the engine of FIG. 2.

Referring to the drawings, FIGS. 2 to 4 are diagrammatic cross-sections through part of a preferred form of internal combustion engine 10 according to the present invention which is similar to that shown in FIG. 1 with like parts having like numbers. However a major difference is that the engine of FIGS. 2 to 5 has separate pistons. The first piston 16 is movable in the first cylinder 12 and is sealed thereto by means of piston rings 16a whilst the smaller second piston 18, movable in the second cylinder 14, is sealed thereto by means of piston rings 18a. Both pistons 16, 18 are connected through respective linkages to a common crank shaft or, alternatively, separate crank shafts which are mechanically coupled. The arrangement shown is such that the pistons are operated substantially in phase but they can also operate with some phase difference.

As can be seen from the drawings, the axis of the cylinder 14 and piston 18 is arranged at right angles to the axis of the cylinder 12 and piston 16, with the cylinder 14 communicating with the cylinder 12 through a port 29.

The piston 18 includes a body 19 and a bobbin shaped end portion formed by a pillar 234 by which a crown 35 of the piston is connected to or integral with the body 19. The combustion chamber or space 20 is defined between the pillar 234 and the wall 14a of the smaller cylinder 14 in a similar manner to that of FIG. 1.

The small cylinder 14 communicates with the larger cylinder 12 through the port 29 which is positioned so as to communicate with the combustion chamber 20 during most of the stroke of the second piston 18. The stroke of the latter is arranged so that at its outer dead center position the peripheral edge 37 of the piston 18 preferably intersects the port 29 so that the larger cylinder 12 communicates both with the combustion chamber 20 and the swept volume of the smaller cylinder 14, whereas at the inner dead center position the port 29 is preferably substantially closed by the body 19 of the piston 18. The piston rings 18a are positioned on the body 19 sufficiently far from the pillar 234 that they do not intersect the port 29.

Finally, the larger piston 16 may have a protrusion 100 which enters and substantially closes the port 29 when the piston is at its inner dead center position.

During the induction stroke fuel and air enter the small cylinder 14 through the valve 31 and substantially air only enters the large cylinder 12 through the air inlet valve 24. The throttle valve 32 is used to control the pressure in the cylinder 14 to be slightly below the pressure in the cylinder 12 at the end of the induction stroke. During the compression strokes of both pistons both inlet valves 24 and 31 close and during ingression, towards the end of the compression strokes, fuel and air are transferred around the edge 37 of the crown of the piston 18 into the combustion chamber 20 where the fuel is ignited by contact with hot air. At the end of the power stroke exhaust gasses are exhausted from cylinder 12 through exhaust valve 26.

The arrangement of the two pistons 16, 18 enables the larger piston 16 to be provided with a different stroke to that of the smaller piston 18 and also to retain a conventional piston shape. This enables existing crank cases to be converted more easily for use in accordance with the present invention.

As is illustrated in the accompanying drawings, the smaller piston 18 may be located in the engine cylinder head with a cooperating crank shaft arranged parallel with the crank shaft for the larger piston 16. Alternatively, the smaller piston 18 can be arranged parallel with the larger piston 16 and may be actuated by a cam or other suitable mechanism.

Having the smaller piston 18 separate from the larger piston 16 enables the stroke of the smaller piston 18 to be kept relatively short which in turn allows a combustion space 20 of relatively short axial length to be formed.

It will be appreciated by those skilled in the art that the engine as described with reference to FIGS. 2 to 5 may be modified by incorporation of any suitable features of the engines described in U.S. Pat. No. 5,117,789 and several of these are described below.

Figure 6:
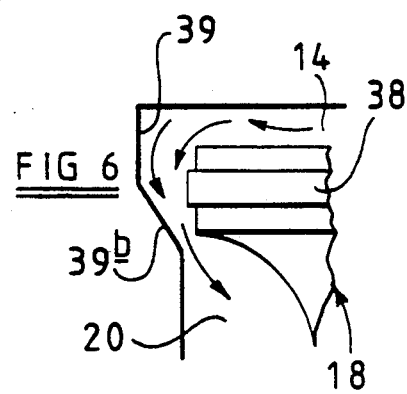
FIG. 6 is a partial section through a part of the engine of FIGS. 2 to 5 showing a modification.

The groove 39 of FIG. 1 may be incorporated in the embodiment of FIGS. 2 to 5 and the cross sectional shape of the groove 39 may vary from that shown in FIG. 1. For example, as shown in FIG. 6, the groove may have a frusto-conical lower wall 39b which provides a gradual rather than an abrupt increasing gap as the piston 18 nears its inner dead center position. FIG. 6 also shows an optional piston ring 38 which can be used effectively to seal across the piston crown 35 and cylinder wall until it reaches the groove 39.

Figure 7A:
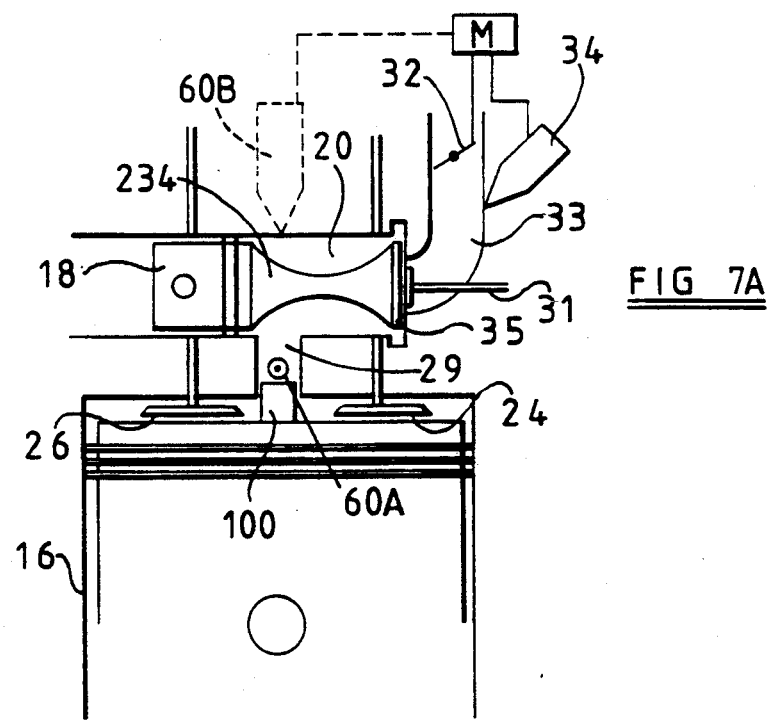
FIG. 7A is a partial section through a second embodiment of engine according to the present invention.

A diesel hybrid engine arrangement in accordance with the present invention which benefits from the Merritt engine segregation system is shown in FIG. 7A. A second fuel source in the form of a high pressure fuel injector 60A or 60B is provided at one of two preferred locations, the first fuel source (injector 34) being arranged to deliver fuel into inlet passage 33 as before.

During the induction stroke, valves 24 and 31 are opened to enable substantially unthrottled air to be admitted into the larger cylinder 12 and fuel and air to be admitted to the smaller cylinder 14. However, whereas in FIGS. 2 to 5, the injector 34 provides substantially the whole of the required quantity of fuel for combustion in the engine, the injector 34 in the FIG. 7A arrangement provides only a fraction of that quantity. As the piston 18 nears its inner dead center position, the injector 60A or 60B delivers its charge of fuel, in diesel engine fashion, directly into the combustion space 20 beneath the piston crown 35 or into the port 29.

As the piston 18 nears its inner dead center position, the vaporised fuel and air mixture above the crown 35 ingresses to the combustion space 20 through the gap 128 defined between the edge 37 of the piston and the wall 14a of the smaller cylinder, now enlarged through by-pass groove 39. Such ingression is also possible if the gap 128 is very small, if groove 39 is provided. During the compression stroke, air from the larger cylinder 12 will have entered the combustion space and will be at a temperature sufficient to ignite the ingressed fuel/air mixture. The injector 60A, 60B is timed to deliver its fuel charge under pressure into the combustion space 20 so as to provide extremely rapid ignition thereof in the presence of the burning ingressed mixture. In that way, the engine utilizes both the fuel segregation method typical of the diesel engine in the form of injector 60A or 60B and the fuel segregation method typical of the Merritt Engine described here. Such a combination of the diesel engine and Merritt Engine principles will enable a diesel engine to operate at high fueling rates with very little, if any, smoke emission and may also enable diesel engines to operate at lower compression ratios and at higher engine speeds. The combination considerably increases the speed of combustion compared with a diesel engine unaided by the Merritt Engine principle.

The amounts of fuel delivered by the injectors 34 and 60A or 60B and the timing thereof will be controlled by means such as an engine management system M in order to provide the correct proportions of fuel between the injectors 34 and 60A or 60B for given running requirements so as, for example, to minimize smoke emission in the exhaust gases. With this arrangement a small (e.g. 4%–10% of the total fuel) amount of fuel can be injected by the injector 34 to vaporise in cylinder 14 and pass to the combustion chamber for compression ignition. This allows the stroke and axial length of the bobbin to be small. The fuel from injector 34 may be preheated to assist vaporising.

The pillar 234 is shown longer than that of FIGS. 2 to 5. This elongation allows the combustion chamber to communicate with port 29 at the inner dead center position of the pistons, the port 29 thus becoming a part of the combustion chamber. If injector 60A is used then the protrusion 100 will fill only a portion of the port 29.

FIG. 7B is a view of the embodiment of FIG. 7A showing the pistons at their outer dead center positions. As can be seen, a gas aperture 135 is formed by the crown 35 of the smaller piston moving beyond the edge of the port 29, allowing blow-down of exhaust gases at the start of the exhaust stroke.

FIG. 8A is a side elevation, partly in section, of the engine of FIG. 7A showing the shape of the passage 29 and protrusion 100 when fuel injector 60A is used. This may be necessary where the bobbin is small and the combustion chamber is therefore small, to provide the necessary clearance volume. As can be seen, the protrusion 100 can be shaped conveniently to assist in promoting swirl motion in the gases in the combustion chamber.

FIG. 8B is a view similar to that of FIG. 8A showing an arrangement in which the total volume of the combustion chamber is increased by the provision of a cavity 229 in the upper surface of the piston 16, replacing the protrusion 100. An alternative position for the second fuel injector is shown at 60C.

Figure 9:
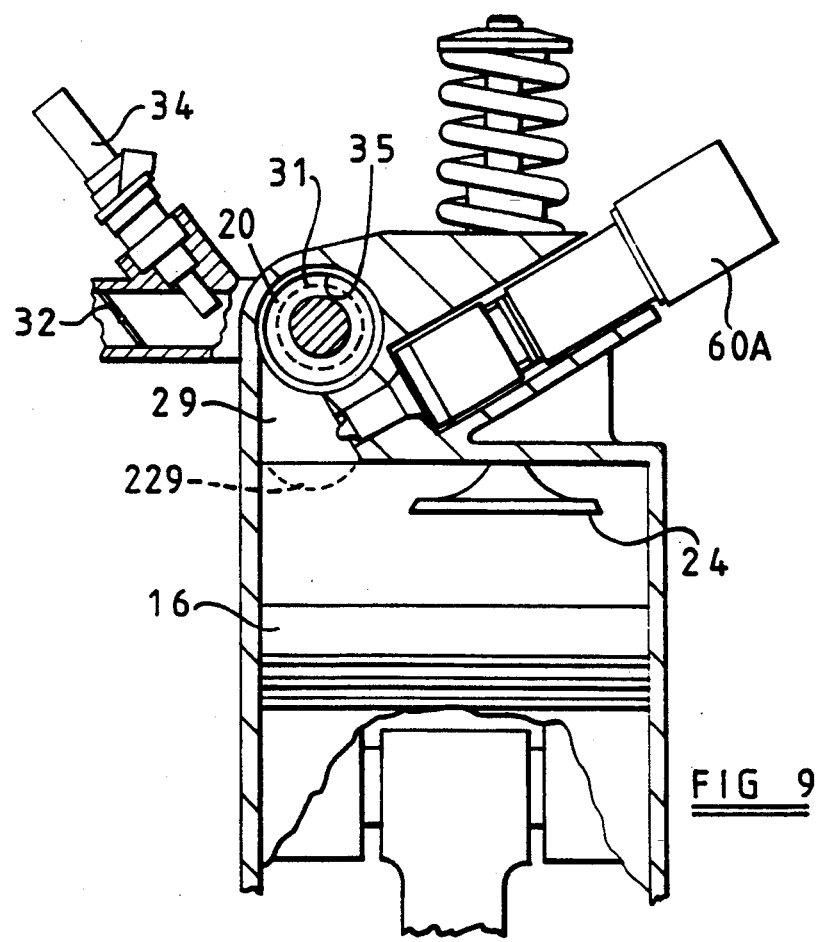
FIG. 9 is a side elevation, partly in section, of a practical example of the engine of FIGS. 7A and 7B.

FIG. 9 is a side elevation, partly in section, of a practical arrangement of the engine shown in FIG. 7B.

Figure 10:
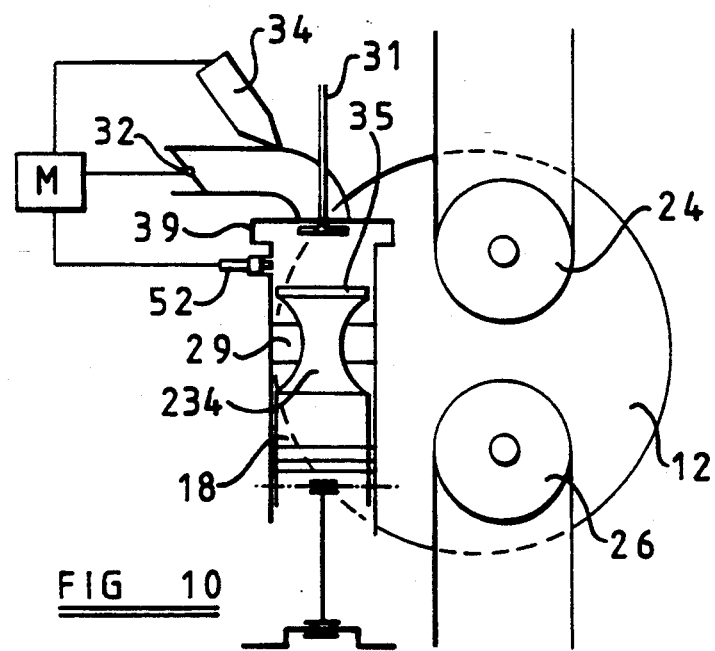
FIG. 10 is a view, similar to that of FIG. 5, showing a third embodiment of engine according to the present invention.

Referring now to FIG. 10 this shows an engine similar to that shown in FIG. 1 with the addition of a spark plug 52.

It discloses a modified way to operate and control the timing of ignition in the engine by starting the ignition process with a spark and allowing the process to continue by compression ignition i.e. spark triggered compression ignition (STCI).

Those skilled in the art are familiar with spark ignition which is used widely in spark ignition engines known as Otto engines or spark ignition gasoline engines (SIGE), where the spark initiates a flame which travels rapidly within a premixed gas volume of fuel and air. STCI is a different process. The ignition by spark is the first of a two stage ignition processes, namely spark-ignition and compression-ignition. In the first stage spark-ignition only initiates a localised flame in the fuel vapor beginning to ingress into the combustion space from the fuel management cylinder, as it begins to mix with air within the combustion space. This spark ignition occurs before the completion of the ingression process in other words before all the fuel has had time to transfer from the fuel management cylinder into the combustion space and to mix with all the air needed for its combustion which is present in the combustion space. The spark ignition stage is a process similar to that of igniting, with a spark, a jet of gaseous fuel whilst it mixes with air on the periphery of the jet.

After the spark ignition process has occurred, the pressure and temperature of the gas in the combustion space of the engine rises sufficiently to enable compression-ignition of the remainder of the vaporised fuel as it ingresses into the combustion space under the action of the second piston. The processes of mixing and burning fuel vapor continues with further air needed to complete the combustion process beyond the instant of spark ignition. In the common spark ignition engine or SIGE, the mixing process between fuel and air is almost complete before the appearance of the spark. An important advantage of using STCI is the ease with which it can be timed to meet variable engine conditions. When using STCI the precision of control required over the timing of the process of ingression can be less important and less critical to the operation of the engine.

To achieve STCI the engine system needs to operate with compression ratios which are insufficient to compression ignite the particular fuel chosen during the early moments of ingression. For example, in the case of high octane rated gasoline the compression ratio may be lowered to a value of say 10:1 for STCI, whereas if compression ignition were to be used on its own with such a fuel a compression ratio value of, for example, 16:1 may be needed. The spark plug is also positioned in a place where it meets fuel vapor whilst the latter mixes with the air in the combustion chamber in the early part of the ingression process. The spark plug generates a spark at the correct time to initiate the compression ignition process.

After igniting some of the fuel which has already started ingressing into the combustion chamber the pressure and temperature in the combustion chamber rises. This causes the remainder of the vaporised fuel, which continues to ingress into the combustion chamber and mix with the air therein, to be ignited by compression ignition even if the original flame started by the spark fails to progress to ignite the rest of the fuel.

Referring to FIG. 10, the engine's geometrical compression ratio may be lowered to a point where compression ignition of the fuel used will not take place below, for example, 12:1 for very high octane gasolines and below 10:1 for mid-range Octane rating gasoline. This design feature ensures that the prevaporised fuel being transferred, or ingressed, from the smaller cylinder 14 into the combustion chamber 20 will not ignite spontaneously on contact with the air in the combustion chamber but will await the spark generated at spark plug 52 by an external control circuit. The spark plug ignites a rich mixture of pre-vaporised fuel in some air at the moment when it begins to mix with some more air and under such conditions that spark ignition can reliably take place.

Spark ignition only affects the fuel which has ingressed across the crown of the second piston by the time spark ignition has taken place. The pressure and temperature rise associated with the combustion initiated by the spark subjects the remainder of the fuel ingressing across the piston crown to ignition by compression.

The main advantage of this method of operation is a much simpler ignition control, through the energising of a spark plug. The exact moment of ingression is no longer critical and ingression can start earlier than is possible with purely compression-ignition engines operating without spark assistance.

The lowering of compression ratio only slightly reduces the thermal efficiency potential of the engine. To balance this effect an increased size of combustion chamber reduces the relative effect of parasitic volumes elsewhere and allows better gas movement during combustion. The control of the spark plug 52, injector 34 and throttle valve 36 can be effected by the engine management system M.

Figures 11A, 11B:
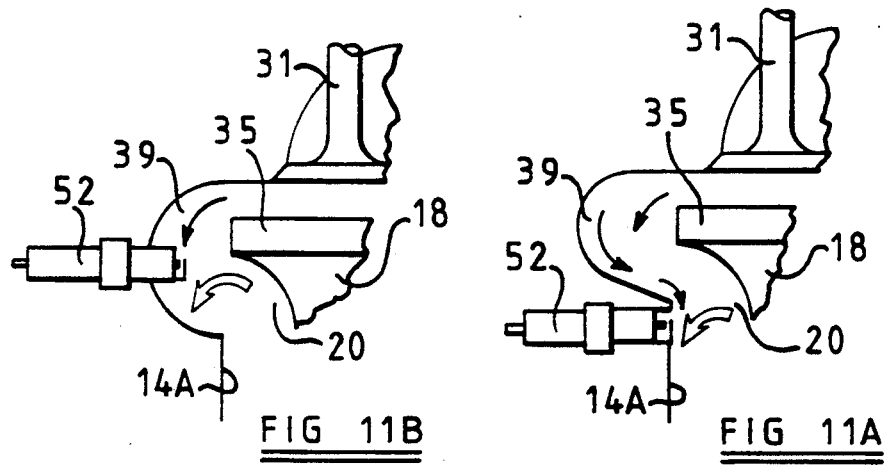
FIGS. 11A and 11B are partial sections through a portion of the engine of FIG. 10 showing various positions for a spark plug of the engine.

FIG. 11 shows possible locations for the spark plug 52. In FIG. 11B the spark plug is shown situated inside the groove 39 in a strategic place where the fuel vapor meets air circulating under the crown of the second piston. The air flow direction is illustrated diagrammatically with a thick arrow and the fuel with a thin arrow. In FIG. 11A the spark plug is shown positioned just below the groove 39. In such a case spark ignition can advantageously be timed to occur as soon as the second piston crown begins to uncover the groove 39.

Figure 12:
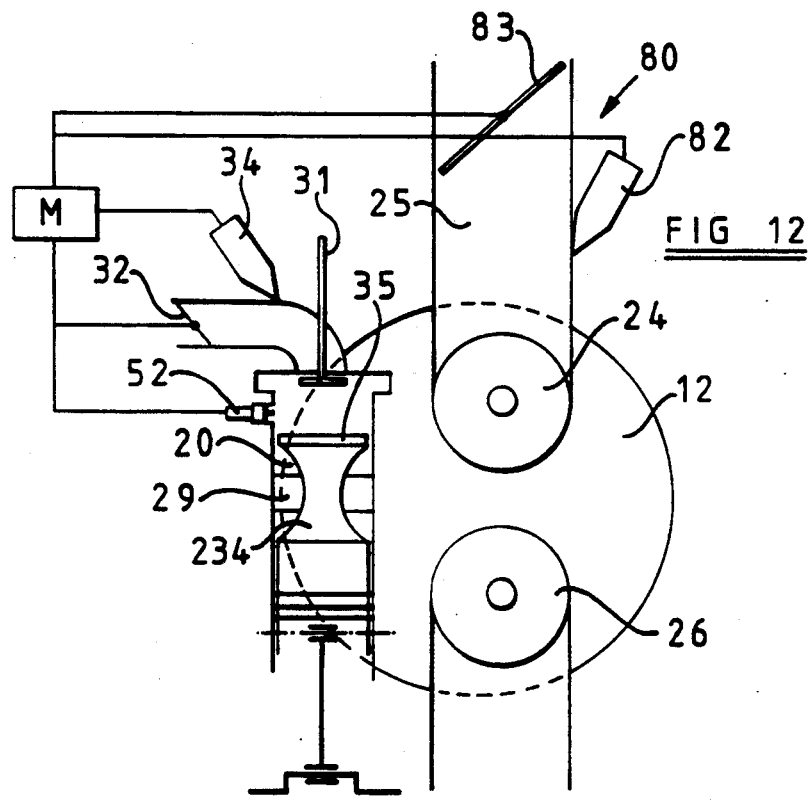
FIG. 12 is a view similar to that of FIG. 10 showing a fourth embodiment of engine according to the present invention.

FIG. 12 shows a further embodiment of engine in which the Merritt segregation system can be combined with the SIGE principle in which fuel and air are premixed at least during the compression stroke for subsequent ignition by the spark to produce power. In such a hybrid arrangement the two combustion principles operate sequentially.

The engine shown in FIG. 12 is constructed in an identical manner to that shown in FIGS. 2 to 5 with the addition of a spark plug 52 and fuel/air management system 80 typical of a spark ignition engine. The system 80 includes a fuel dispenser which, in this case is a low pressure injector 82 (but which could comprise a fuel/air metering device such as a carburettor) and a throttle valve 83. Such a system provides close control of the fuel/air proportions to facilitate spark ignition.

In operation, the engine may be started up and warmed up as a spark ignition engine operating the system 80 with the fuel injector 34 switched off and the throttle valve 32 in the inlet duct 33 closed. During induction a fuel/air mixture is admitted through inlet valve 24 into the larger cylinder 12. During compression the mixture is compressed into the combustion space 20 where it is ignited by a spark from spark plug 52, ignition being timed to take place around inner dead center. By opening the throttle valve 83 and increasing fuel supply, the power may be increased. However there will be a limit to the opening of the throttle valve 83 and to the amount of fuel/air quantity which can be drawn into the larger cylinder 12 imposed by the compression ratio of the engine which in the Merritt mode should be sufficiently high to permit compression ignition, whereas compression ignition in cylinder 12 should be avoided in the spark ignition mode of operation. If the engine operates on the STCI principle using the same spark plug, throttle valve 83 may be opened fully at full load.

Once the engine has been warmed up, the injector 82 can be switched off, throttle 83 opened, injector 34 switched on and throttle valve 32 operated normally whereby the engine will operate in the manner described with respect to FIG. 10. The switch over can be made gradually by admitting an increasing amount of spark ignitable mixture through second inlet valve 31 into the second cylinder 14 whilst reducing the quantity of mixture admitted through inlet valve 24 under control of an engine management system.

As well as being useful for start-up and warm up of the engine, the hybrid arrangement of FIG. 12 can provide the engine with a choice of running modes. The Merritt running mode will be particularly advantageous when requiring part-load fuel economy or when wishing to operate on different fuels, e.g. alcohols which can be supplied to injector 34, the Merritt mode is less sensitive to fuel variation and particularly octane number. When operating on the STCI principle the SIGE mode may be used at full load to achieve full air utilization when maximum power is required.

Figure 13A:
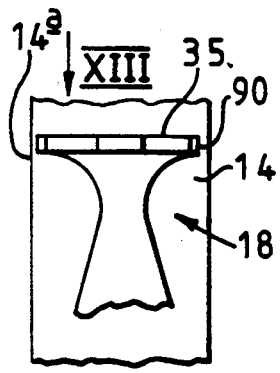
FIG. 13A is a side elevation of part of a modified smaller piston in its cylinder.
Figure 13B:
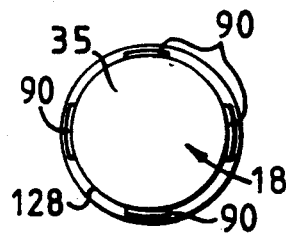
FIG. 13B is a plan view of the piston of FIG. 13A viewed in the direction of arrow XIII.
Figure 13C:
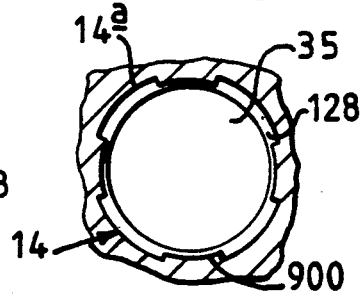
FIG. 13C is a transverse cross-section through a second cylinder modified to provide an alternative to the arrangement of FIG. 13A.

In FIGS. 13A to 13C the smaller piston 18 is shown with four radial projections 90 extending from its crown 35 to provide sideways support for sliding contact with the wall 14a of cylinder 14. The gap 128 should be interrupted as little as possible by the projections 90 which will be dimensioned accordingly. As the projections will in effect operate as dry bearing elements for the piston crown they should be made from a suitable material which can also withstand high temperatures.

In FIG. 13C, the wall 14a of the second cylinder 14 is formed with radially inwardly directed axially extending projections 900 which provide support for the crown 35 of piston 18 in place of the projections 90 in FIGS. 13A to 13C. In such a case, the projections effectively interrupt the gap 128. The projections may also be inclined to the cylinder axis but with an axial component.

In FIGS. 2 to 13, the smaller piston is substantially of a mushroom shape having a center pillar with a crown at its upper end. FIGS. 14A and 14B illustrate an alternative construction where the crown 35 is supported by a number of circumferentially spaced pillars 100 which extend from the body 19 of piston 18. If desired the piston 18 can include a base 84 as shown in broken lines. Such an arrangement still provides a substantially open combustion space 20 as well as leaving a thin edge 37 over a substantial part of the crown 35 to facilitate the formation of the inhibiting gap 128 as shown in FIG. 14B.

To promote swirl of air entering the combustion space 20 during the compression stroke, a curved projecting member 101 may be positioned beneath the crown 35, e.g. on the base 84 as shown in broken lines. The projecting member may include vanes to promote rotational flow about the axis of the piston.

A further construction for the smaller piston 18 is shown in FIG. 15 where a skirt 110 interconnects the crown 35 with the body 19 of piston 18 and in which skirt is formed with a plurality of substantial apertures 111. The apertures are preferably of varying width as shown, for example, of inverted triangular shape to maximise the circumferential length of the thin edge 37 of the crown 35. As with FIG. 14A, a projecting member 101 can be provided and a base 84 can also be provided.

In the previous embodiments the engine operates on a four stroke cycle. FIG. 16 illustrates a form of the engine of the present invention which can operate on a two stroke cycle.

In FIG. 16 the inlet and exhaust valves 24 and 26 are replaced by inlet and exhaust ports 124 and 126 respectively. A spark plug 52 may be provided on wall 14a of the smaller cylinder 14 as shown in FIGS. 10 to 12 for starting and/or idling and/or on STCI operation. The engine is provided with the access means 30 comprising inlet valve 31 with or without the throttle valve 32. The inlet valve 31 can be cam operated or electromagnetically operated. A fuel source such as low pressure injector 34 is positioned upstream of valve 31 and can deliver fuel to an inlet duct 33 when valve 31 is either closed or open. The engine can also be operated as a diesel hybrid in a 2-stroke form with an injector 60A or 60B as described in FIGS. 6 to 9.

Smaller piston 18 is of mushroom shape although it could be of the kind shown in FIGS. 14 or 15.

In operation, air is admitted from a suitable source 132 of pressurised air, e.g. a crankcase or external pump, to the ducts 33 and 133 at above atmospheric pressure. Duct 33 may be supplied with air from a separate source if desired. When the inlet port 124 (connected to duct 133) is uncovered by piston crown 36, air under pressure enters the larger cylinder 12 whilst exhaust gases from a previous cycle are displaced through exhaust port 126. Simultaneously, valve 31 opens and admits air from duct 33 into the smaller cylinder 14 above crown 35. Some of that air will displace exhaust gases from the previous cycle through the inhibiting gap around the crown 35. When the crown 35 is at its outer dead center position. The gap 135 assists in the movement of exhaust gases from the smaller cylinder 14 to the larger cylinder 12, allowing blow down to take place at the start of the exhaust process.

Fuel may enter the smaller cylinder 14 with the air as soon as valve 31 opens but alternatively the start of the fuel delivery could be delayed until the piston 18 moves a little from its outer dead center position to close the gaps 135 and preferably before the exhaust port 126 is covered by the larger piston 16. The closing of valve 31 should preferably be delayed until the pressure in the larger cylinder begins to rise during the early part of the compression stroke after the exhaust port 126 is closed. In that way the Merritt segregation principle using gap 128 is assisted. If valve 31 is electromagnetically actuated, variation in closing timing may be used to control ingression instead of throttle valve 32. Towards the end of the compression stroke, ingression of the fuel air mixture takes place through inhibiting gap 128 and possibly through the by-pass groove 39, if provided. Ignition follows by contact with hot air in the combustion space 20 with or without assistance from the spark plug which communicates directly with combustion space 20 beneath crown 35 when the latter is near the inner dead center position. At the end of the expansion stroke, the exhaust gases escape from the exhaust port 126 and the gap 135 will assist in equalising the pressure across the small piston crown 35.

The two stroke cycle for the Merritt engine can operate in any of the aforesaid hybrid arrangements with both diesel and spark engine cycles including the spark triggered compression ignition arrangement.

I claim:

1. An internal combustion engine comprising:
   at least one set of first and second cylinders, the first cylinder having a larger swept volume than the second cylinder;
   first and second pistons each movable between an inner dead center position and an outer dead center position in a respective one of said cylinders;
   air inlet means communicating with the first cylinder;
   exhaust means communicating with the first cylinder;
   a first fuel source for providing fuel to the second cylinder;
   means defining a combustion space when the pistons are substantially at their inner dead center positions, the combustion space communicating simultaneously with both cylinders during at least a portion of an expansion stroke of the pistons;
   inhibiting means for inhibiting movement of fuel/air mixture from the second cylinder into the combustion space until towards an end of a compression stroke of the second piston;
   access means associated with the second cylinder for admitting air to the second cylinder during an induction stroke of the second piston from its inner to its outer dead center position, said access means comprising a first port means opening into said second cylinder and a first valve means for controlling said first port means;
   and means coupling said first and second pistons such that said pistons are reciprocable in said cylinders at an identical frequency;
   wherein the second piston is not carried by the first piston;
   wherein the second piston has a crown and a body portion spaced apart by a predetermined distance in a direction axially of the second piston, said crown is connected to said body portion by a reduced diameter portion and has an edge which is relatively small in said axial direction compared to the distance between said crown and said body portion in said axial direction, thereby to define said combustion space between said piston crown and body portion and a side wall of said second cylinder;
   and wherein the edge of the second piston crown is radially spaced from the side wall of the second cylinder to define a gap therebetween which comprises said inhibiting means, said gap being continuous throughout the entire stroke of the second piston.

2. An engine according to claim 1 wherein said combustion space communicates with said first cylinder through a second port means.

3. An engine according to claim 2 wherein said first piston has a projection formed on a crown thereof which engages in said second port means at the inner dead center position of the first piston to displace gas from said second port means into said combustion space.

4. An engine according to claim 2 wherein said first piston has a recess formed in a crown thereof facing said second port means.

5. An engine according to claim 2, wherein, at an outer dead center position of said second piston, said piston edge intersects said second port means to open said second cylinder to said first cylinder above said second piston crown.

6. An engine according to claim 2 wherein, at the inner dead center position of said second piston said body portion of said second piston closes said second port means.

7. An engine according to claim 2 wherein, at the inner dead center position of said second piston, said combustion space opens into said first cylinder through said second port means.

8. An engine according to claim 7 wherein a second fuel source, in the form of a high pressure liquid fuel injector, is located for delivering into said second port means a quantity of fuel under pressure in addition to fuel supplied to said second cylinder by said first fuel source.

9. An engine according to claim 8 having means for controlling said first fuel source to deliver a proportion of the total fuel quantity to be delivered into the second cylinder into the space above the crown of the second piston, and for controlling said second fuel source to deliver a further proportion of the total fuel quantity into the combustion space when the second piston approaches its inner dead center position.

10. An engine according to claim 2 wherein a second fuel source, in the form of a high pressure liquid fuel injector, is located for delivery into said combustion space a quantity of fuel under pressure in addition to fuel supplied to said second cylinder by said first fuel source.

11. An engine according to claim 1 wherein a second fuel source, in the form of a high pressure liquid fuel injector, is located for delivery into said first cylinder a quantity of fuel under pressure in addition to fuel supplied to said second cylinder by said first fuel source.

12. An engine according to claim 1 further comprising means for controlling ignition of the fuel in said combustion space.

13. An engine according to claim 12 wherein said ignition controlling means comprises a spark plug.

14. An engine according to claim 13 wherein the compression ratio of the engine is below that required for compression ignition to take place.

15. An internal combustion engine according to claim 1 wherein the second cylinder is formed adjacent its inner end with means defining a first by-pass around the edge of the second piston crown when the second piston is adjacent its inner dead center position.

16. An internal combustion engine according to claim 15 wherein said first by-pass means has an axial length greater than a thickness of the edge of said second piston crown.

17. An internal combustion engine according to claim 16 wherein said first by-pass means is a groove formed in the side wall of the second cylinder extending over at least a portion of a circumference of the second cylinder.

18. An internal combustion engine according to claim 17 wherein said second cylinder has a bore and said first by-pass means is defined by an abrupt enlargement of said bore.

19. An engine according to claim 18 wherein the access means includes a first variable flow area valve means upstream of the first valve means; and wherein a second fuel source is provided in said air inlet means of said first cylinder for providing a spark ignitable fuel/air mixture to enable the engine to operate in a conventional spark ignition mode.

20. An engine according to claim 19 having:
second variable flow area valve means positioned upstream of said air inlet means and communicating with said first cylinder for enabling the restriction of air supply to said first cylinder during engine part load conditions; and control means for controlling said first and second fuel sources and said second variable flow area valve means to change over the engine between said conventional spark ignition mode wherein said first fuel source is substantially inoperative and the second variable flow area valve means is partially closed to limit compression temperature to below compression ignition value and a compression ignition mode with or without spark ignition assistance in which said second fuel source is substantially inoperative and said second variable flow area valve means is substantially fully open to raise compression temperature to enable compression ignition.

21. An engine according to claim 19 having:
second variable flow area valve means positioned upstream of said air inlet means and communicating with said first cylinder for enabling the restriction of air supply to said first cylinder during engine part load conditions; and control means for controlling said first and second fuel sources and said second variable flow area valve means to change over the engine between said conventional spark ignition mode in which said first fuel source is substantially inoperative and the second variable flow area valve means is partially closed to control compression temperature and a spark triggered compression ignition mode in which said second fuel source is substantially inoperative and said second variable flow area valve means is substantially fully open.

22. An engine according to claim 19 wherein the gap is a continuous annular clearance between said edge of the second piston crown and an adjacent wall of the second cylinder.

23. An engine according to claim 1 further comprising a spark plug for controlling ignition of the fuel in said combustion space; wherein the second cylinder is formed adjacent its inner end with a groove defining a first by-pass around the edge of the second piston crown when the second piston is adjacent its inner dead center position; and wherein said spark plug is located in said groove.

24. An engine according to claim 1 further comprising a spark plug for controlling ignition of the fuel in said combustion space; wherein the second cylinder is formed adjacent its inner end with a groove defining a first by-pass around the edge of the second piston crown when the second piston is adjacent its inner dead center position; and wherein said spark plug is located adjacent said groove.

25. An engine according to claim 1 wherein the access means includes a first variable flow area valve means upstream of the first valve means.

26. An engine according to claim 25 wherein the variable flow area valve means is a throttle valve.

27. An engine according to claim 1 wherein the first fuel source is positioned upstream of the first valve means.

28. An engine according to claim 1 wherein a second variable flow area valve means is positioned upstream of said air inlet means communicating with said first cylinder for enabling the restriction of air supply to said first cylinder during engine part load conditions.

29. An engine according to claim 1 wherein the engine operates on a two stroke cycle.

30. An engine according to claim 29 having means for controlling said first valve means to close said first valve means during or after closure of said exhaust means.

31. An engine according to claim 1 wherein said gap is interrupted by two or more radial projections on at least one of said second piston crown and a wall of the second cylinder which may slidably engage with the other of said second piston crown and said wall of said second cylinder to provide support for the second piston.

* * * * *